US012659288B2

(12) United States Patent
Mylavarapu et al.

(10) Patent No.: US 12,659,288 B2
(45) Date of Patent: Jun. 16, 2026

(54) SYSTEMS AND METHODS FOR IMPROVING DATA STREAM CONTINUITY WITH AN ENDPOINT MAPPER UPDATED WITH PREDICTED ADDRESSES OF A LATER-PROVISIONED DATA-STREAMING CLUSTER

(71) Applicant: Capital One Services, LLC, McLean, VA (US)

(72) Inventors: Teja Swaroop Mylavarapu, Leesburg, VA (US); Anjali Gupta, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 27 days.

(21) Appl. No.: 18/801,327

(22) Filed: Aug. 12, 2024

(65) Prior Publication Data

US 2026/0046270 A1 Feb. 12, 2026

(51) Int. Cl.
*H04L 61/25* (2022.01)
*H04L 61/4535* (2022.01)
*H04L 67/02* (2022.01)

(52) U.S. Cl.
CPC .......... *H04L 61/25* (2013.01); *H04L 61/4535* (2022.05); *H04L 67/02* (2013.01)

(58) Field of Classification Search
CPC .............. H04W 80/04; H04W 28/0268; H04L 61/2514; H04L 69/16
See application file for complete search history.

(56) References Cited

U.S. PATENT DOCUMENTS

2010/0011120 A1* 1/2010 Kommula ........... H04L 67/1021
709/235
2017/0279792 A1* 9/2017 Tse ........................ H04L 63/062
2022/0321596 A1* 10/2022 Weizman ............ H04L 61/4511

* cited by examiner

*Primary Examiner* — Chirag R Patel
(74) *Attorney, Agent, or Firm* — Foley & Lardner LLP

(57) ABSTRACT

The system may obtain a first data stream generated by a first set of endpoints from a first set of addresses for the first set of endpoints, wherein the mapper maps the first set of addresses to a set of stable addresses. The system may update the mapper to map a set of stable addresses to a set of anticipated addresses by predicting the set of anticipated addresses for a second set of endpoints based on a history of endpoint addresses. The system may provision the second set of endpoints, wherein provisioning the second set of endpoints comprising generating a second set of addresses for the second set of endpoints, wherein the second set of addresses matches with the set of anticipated addresses. The system may obtain a second data stream generated by the second set of endpoints.

20 Claims, 6 Drawing Sheets

100

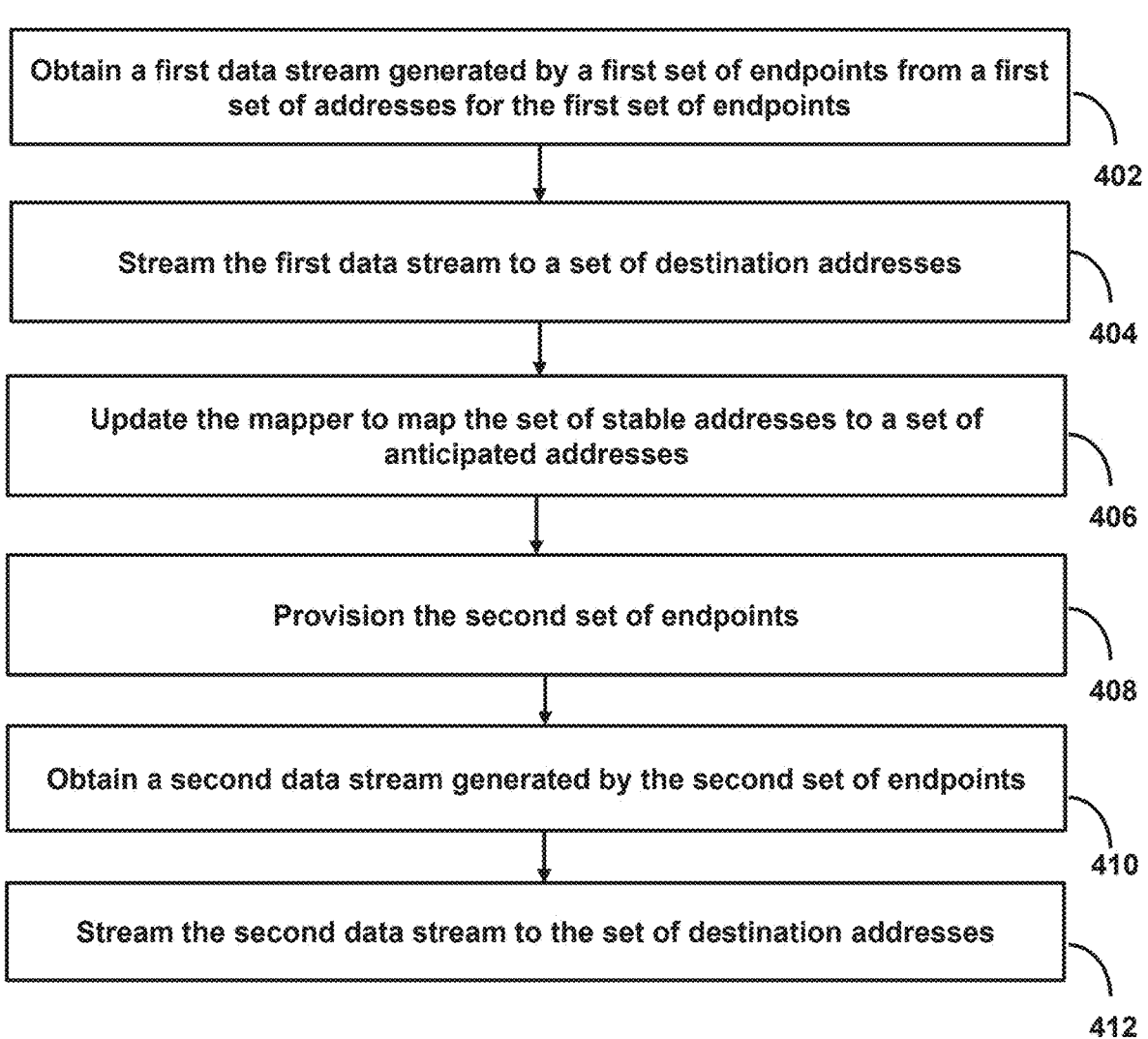

400

Obtain a first data stream generated by a first set of endpoints from a first set of addresses for the first set of endpoints

402

Stream the first data stream to a set of destination addresses

404

Update the mapper to map the set of stable addresses to a set of anticipated addresses

406

Provision the second set of endpoints

408

Obtain a second data stream generated by the second set of endpoints

410

Stream the second data stream to the set of destination addresses

SYSTEMS AND METHODS FOR IMPROVING DATA STREAM CONTINUITY WITH AN ENDPOINT MAPPER UPDATED WITH PREDICTED ADDRESSES OF A LATER-PROVISIONED DATA-STREAMING CLUSTER

BACKGROUND

Computer systems are interconnected through Internet Protocol (IP) addresses, Application Programming Interfaces (APIs), and Uniform Resource Locators (URLs), each playing a distinct role in facilitating communication and data exchange. An IP address is a unique numerical label assigned to each device connected to a network, enabling devices to locate and communicate with each other. For example, when a user types a website address into a browser, the domain name is translated into an IP address, directing the request to the appropriate server. APIs or Application Programming Interfaces, allow different software applications to communicate with each other by defining a set of rules and protocols. APIs enable systems to request and exchange data seamlessly, such as when a mobile app retrieves weather data from a remote server. URLs or Uniform Resource Locators, are specific addresses used to access resources on the internet. A URL typically includes the protocol (e.g., HTTP or HTTPS), the domain name, and the specific resource path, providing a way to locate and access web pages and other online resources. Together, IP addresses, APIs, and URLs form the backbone of modern digital communication, enabling diverse systems and applications to interconnect, share information, and deliver a wide range of services to users globally.

SUMMARY

The generation and proliferation of various IP addresses, APIs, and URLs is inevitable as the myriad of interconnected computer systems grows due to the fundamental need for unique identifiers in network communication. As the number of devices, such as computers, smartphones, IoT devices, and servers, continues to expand exponentially, each requires a distinct address to ensure accurate data routing and communication. To enhance human readability, IP addresses are often translated to CNAMEs (Canonical Name)/TrueNames. Moreover, in many instances, these IP addresses, APIs, and URLs are changed dynamically to account for changes in environments due to deployment, ephemeral servers, Active/Inactive Stacks, Failover Regions, and/or Standby systems. Therefore, it becomes cumbersome and error-prone to keep track of these dynamically changing URLs due to the sheer volume (e.g., hundreds and thousands of CNAMEs/TrueNames) involved in the various domains and environments. Additionally, the proliferation of new technologies and services, such as cloud computing, smart cities, and autonomous systems, further escalates the demand for IP addresses. This dynamic nature of network growth necessitates ongoing management and allocation of IP addresses to maintain seamless and efficient communication across the expanding landscape of interconnected systems.

In view of the dynamic proliferation, systems and methods are described herein for novel uses and/or improvements to artificial intelligence applications. As one example, systems and methods are described herein for an intelligent mapper, which keeps track of the new CNAMEs/TrueNames that are generated dynamically in various domains and ecosystems. As one example, the system determines a cluster of endpoints that have its own static URL, which is externalized and exposed to the potential clients. Each cluster may also have custom configurations with the mapper where it keeps track of the new CNAMEs that are generated in the system and maps them to the static URL that is already externalized. By doing so, potential clients may continue to use the same static URLs, even though the endpoints to which they are mapped have changed.

In some aspects, systems and methods are described herein for improving data stream continuity with an endpoint mapper by updating the endpoint mapper with predicted addresses of a later-provisioned data-streaming cluster. For example, the system may obtain, at a mapper, a first data stream generated by a first set of endpoints from a first set of addresses for the first set of endpoints, wherein the mapper maps the first set of addresses to a set of stable addresses. The system may stream the first data stream from the set of stable addresses to a set of destination addresses. The system may update the mapper to map the set of stable addresses to a set of anticipated addresses by predicting the set of anticipated addresses for a second set of endpoints based on a history of endpoint addresses. The system may provision the second set of endpoints, wherein provisioning the second set of endpoints comprising generating a second set of addresses for the second set of endpoints, wherein the second set of addresses matches with the set of anticipated addresses. The system may obtain a second data stream generated by the second set of endpoints. The system may stream the second data stream from the set of stable addresses to the set of destination addresses.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in improving data stream continuity with an endpoint mapper, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
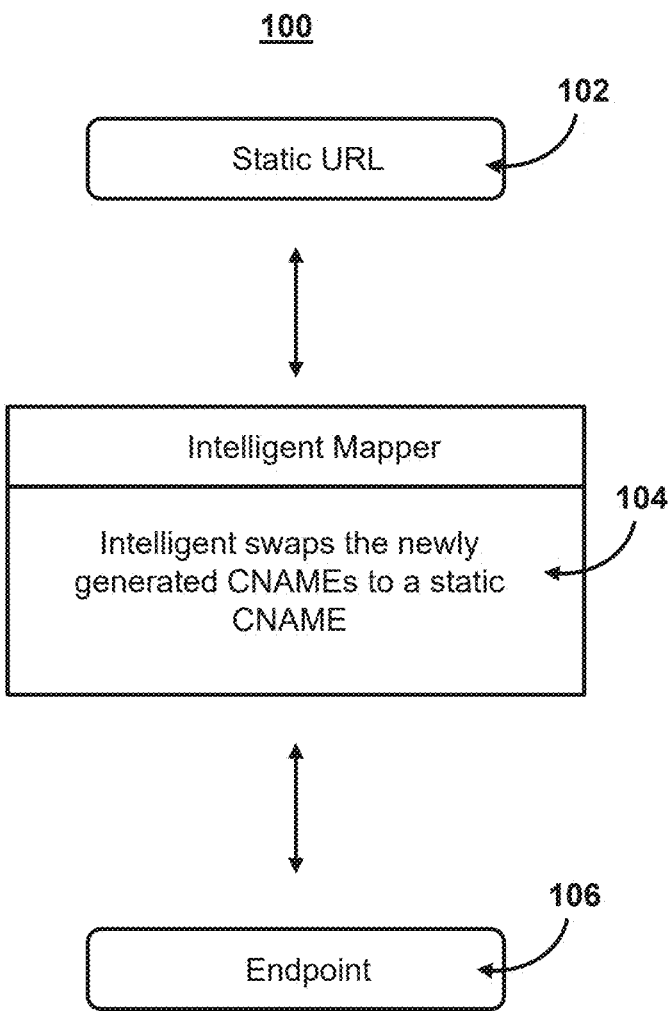
FIG. 1 shows an illustrative diagram for an intelligent mapper, in accordance with one or more embodiments.

FIG. 1 shows an illustrative diagram for an intelligent mapper, in accordance with one or more embodiments. For example, system 100 may represent an intelligent mapper (e.g., mapper 104), which keeps track of new CNAMEs/TrueNames that are generated dynamically in various domains and ecosystems.

As referred to herein, CNAMEs, or Canonical Names, also referred to as TrueNames, are a type of resource record in the Domain Name System (DNS) that maps an alias name to a true or canonical domain name. This allows multiple domain names to point to the same IP address without duplicating DNS records. Essentially, a CNAME record ensures that when a user types in an alias domain, the DNS system redirects them to the true domain where the actual resources are hosted. For example, a website might use several subdomains like www.example.com, mail.example-.com, and blog.example.com, all pointing to a single server. Instead of assigning an IP address to each subdomain, CNAME records can be used to point all these subdomains to a single canonical domain name, such as example.com. This simplifies DNS management, ensuring consistency and making it easier to update the IP address associated with the domain.

As one example, the system determines a cluster of endpoints that have its own static URL (e.g., static URL 102), which is externalized and exposed to the potential clients. Each cluster may also have custom configurations with the mapper where it keeps track of the new CNAMEs that are generated in the system and maps them to the static URL that is already externalized. By doing so, potential clients may continue to use the same static URLs, even though the endpoints (e.g., endpoint 106) to which they are mapped have changed.

Static URL 102 may comprise a first data stream generated by first nodes of a first computing cluster from a first set of node addresses for the first nodes, wherein the endpoint mapper maps the first set of node addresses to a set of stable client-facing addresses. For example, to ensure seamless and stable communication with client applications, the endpoint mapper (e.g., mapper 104) maps a set of stable, client-facing addresses. When a client requests the data stream, it interacts with these stable addresses instead of the fluctuating node addresses. The endpoint mapper dynamically resolves the stable addresses to current node addresses, enabling the client to access the required data stream without being affected by the underlying changes in the node configuration. This mechanism ensures a reliable and consistent data retrieval process, enhancing the system's robustness and client experience.

As described herein, a set of stable client-facing URL addresses may refer to a collection of URLs that are consistently used by clients to access services, resources, or applications regardless of underlying changes in the infrastructure. These URLs remain constant even when the actual server addresses or nodes that handle the requests change due to maintenance, scaling, or other operational reasons. By providing a stable point of access, these URLs simplify client interactions and improve reliability, as clients do not need to be aware of or adapt to changes in the backend. The stability is often achieved through the use of load balancers, DNS configurations, or reverse proxies that map the stable URLs to the current active server addresses dynamically. This approach ensures continuous availability and seamless access to services for clients, enhancing user experience and reducing the complexity of managing client-server communication.

Mapper 104 may stream the first data stream from the set of stable client-facing addresses of the endpoint mapper to a set of client addresses adapted to data format used in the first data stream and a later data stream. For example, as data streams in, the mapper examines the format and structure of the first data stream and any subsequent data streams. It then adapts the data to meet the specific requirements and formats expected by the client addresses. This involves converting data formats, encoding, or restructuring data packets as necessary. The mapper ensures that the data is consistently transformed into a client-compatible format, regardless of the original data stream's structure. By handling these adaptations, the mapper allows clients to seamlessly receive and process data from the cluster without needing to handle complex data format transformations themselves. This process facilitates smooth and efficient data communication, ensuring compatibility and reducing the burden on client-side implementations.

Mapper 104 may then update the mapping to map the set of stable client-facing addresses to a set of anticipated addresses by predicting the set of anticipated addresses for second nodes of a second computing cluster that is not yet provisioned based on a history of endpoint addresses. For example, the system may map a set of stable client-facing addresses to a set of anticipated addresses for second nodes of a second computing cluster that is not yet provisioned by leveraging historical data and predictive algorithms. Initially, the system analyzes a history of endpoint addresses used by previously provisioned nodes in similar clusters. This historical data provides insights into patterns and trends in address allocation, which the system uses to predict the likely addresses for the future second nodes. The predictive model considers factors such as previous address usage, allocation patterns, and potential scaling requirements. Based on these predictions, the system preemptively maps the stable client-facing addresses to the anticipated addresses of the second nodes. This proactive mapping ensures that when the second computing cluster is eventually provisioned, the client-facing addresses are already aligned with the anticipated node addresses, facilitating immediate and seamless communication. By predicting and mapping in advance, the system reduces latency and improves the efficiency of bringing new clusters online, ensuring continuity and stability in client access.

Mapper 104 may then provision the second computing cluster, the provisioning causing a creation of a second set of node addresses for the second nodes, wherein the second set of node addresses matches with the set of anticipated addresses. For example, the system may create a second set of node addresses by following a structured process that involves the allocation and configuration of network resources for the nodes within a second computing cluster. Initially, the system determines the required number of nodes based on workload demands, cluster size, and performance criteria. It then communicates with the network infrastructure to allocate IP addresses or other network identifiers for each node. These addresses are typically drawn from a predefined pool of available addresses managed by the network's addressing scheme. Once the addresses are allocated, the system configures each node with its assigned address, ensuring proper network settings such as subnet masks, gateways, and DNS configurations. This configuration allows the nodes to communicate within the cluster and with external systems. Additionally, the system updates any relevant mappings or records, such as DNS entries or endpoint mappers, to reflect the new addresses, ensuring they are recognized and accessible. This process ensures that the second set of node addresses is systematically generated, allocated, and integrated into the network, enabling the new computing cluster to function correctly and efficiently.

System 100 may then obtain, at the endpoint mapper, a second data stream generated by the second nodes of the provisioned second computing cluster and streams the second data stream from the set of stable client-facing addresses of the endpoint mapper to the set of client addresses. For example, mapper 104 may track new CNAMEs or TrueNames that are generated dynamically across various domains and ecosystems by leveraging a combination of monitoring, configuration management, and dynamic mapping capabilities. Each cluster within the system has its own static URL, which is externalized and exposed to clients, providing a stable access point. The mapper associated with each cluster also has its own static URL and is configured to monitor the generation of new CNAMEs within the cluster. As new CNAMEs are created, the mapper dynamically updates its internal mappings to associate these new CNAMEs with the existing static URLs. This involves real-time tracking and updating of the configuration records to reflect the changes in the DNS entries. The mapper uses automation tools and scripts to ensure that these updates are seamless and do not disrupt the service provided to the clients. By dynamically mapping new CNAMEs to the static URLs, the mapper ensures that clients can continue accessing the services without any interruptions or need for reconfiguration on their end. This approach allows the system to adapt to changes in the network infrastructure while maintaining consistent and reliable access for consumers.

Figure 2A:
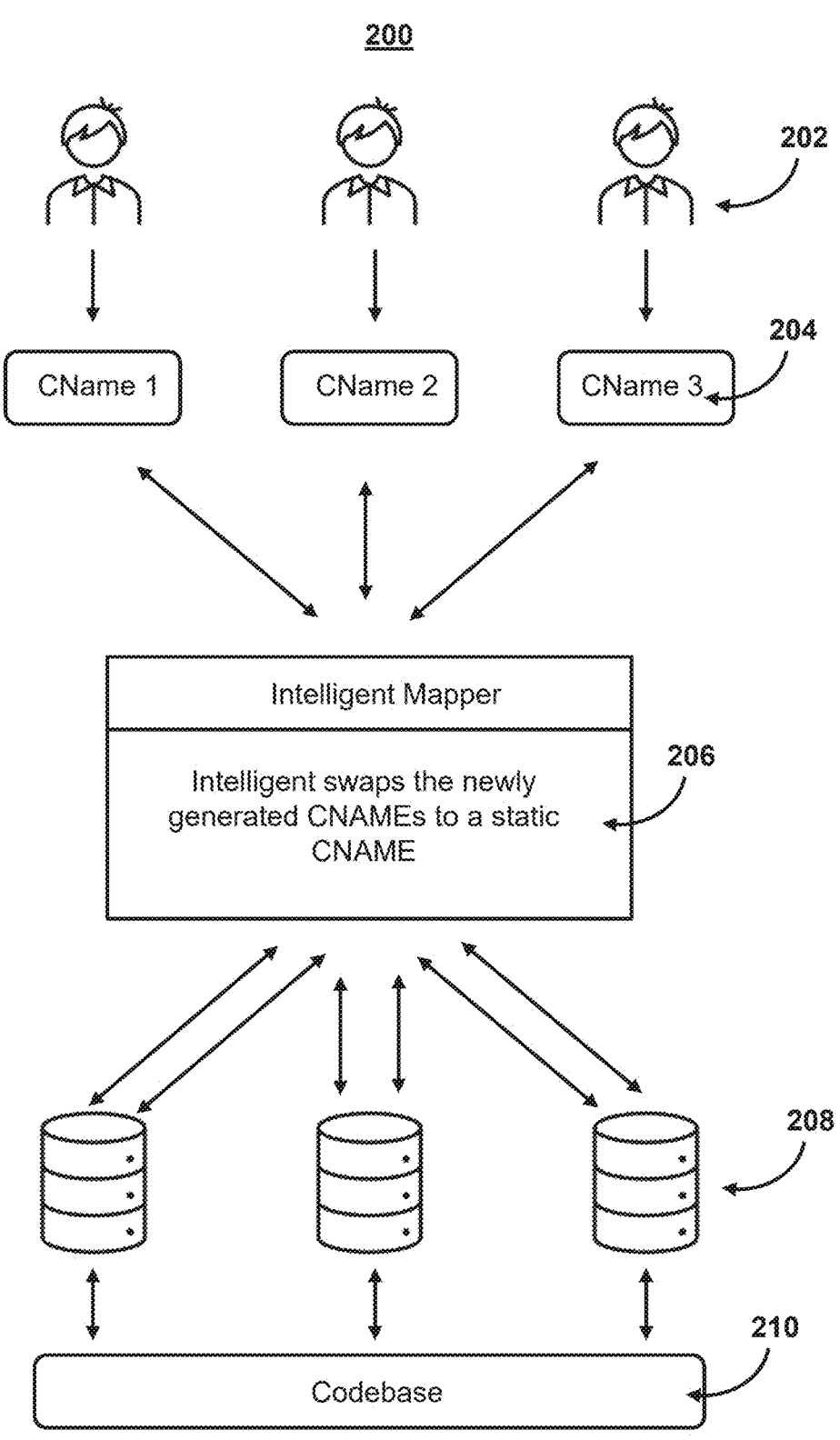
FIGS. 2A-C show an illustrative diagram for systems employing intelligent mappers, in accordance with one or more embodiments.
Figure 2B:
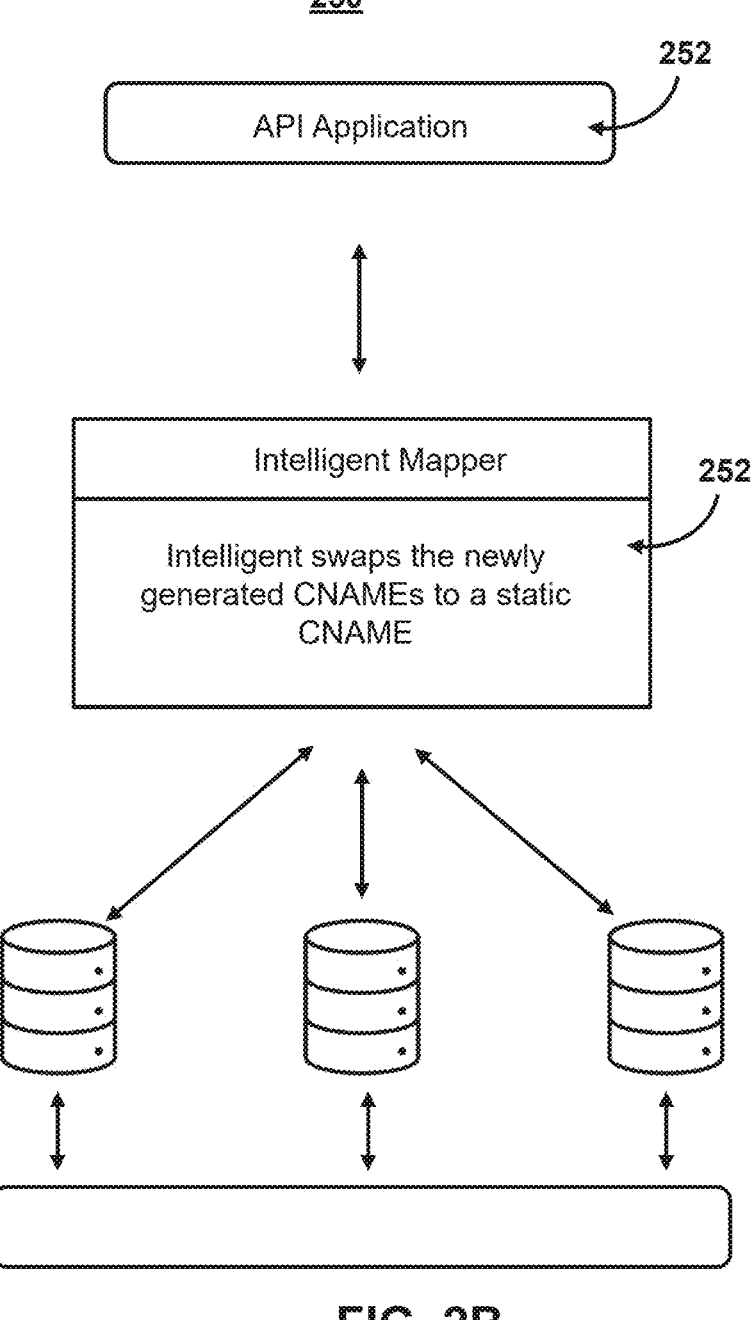
Figure 2C:
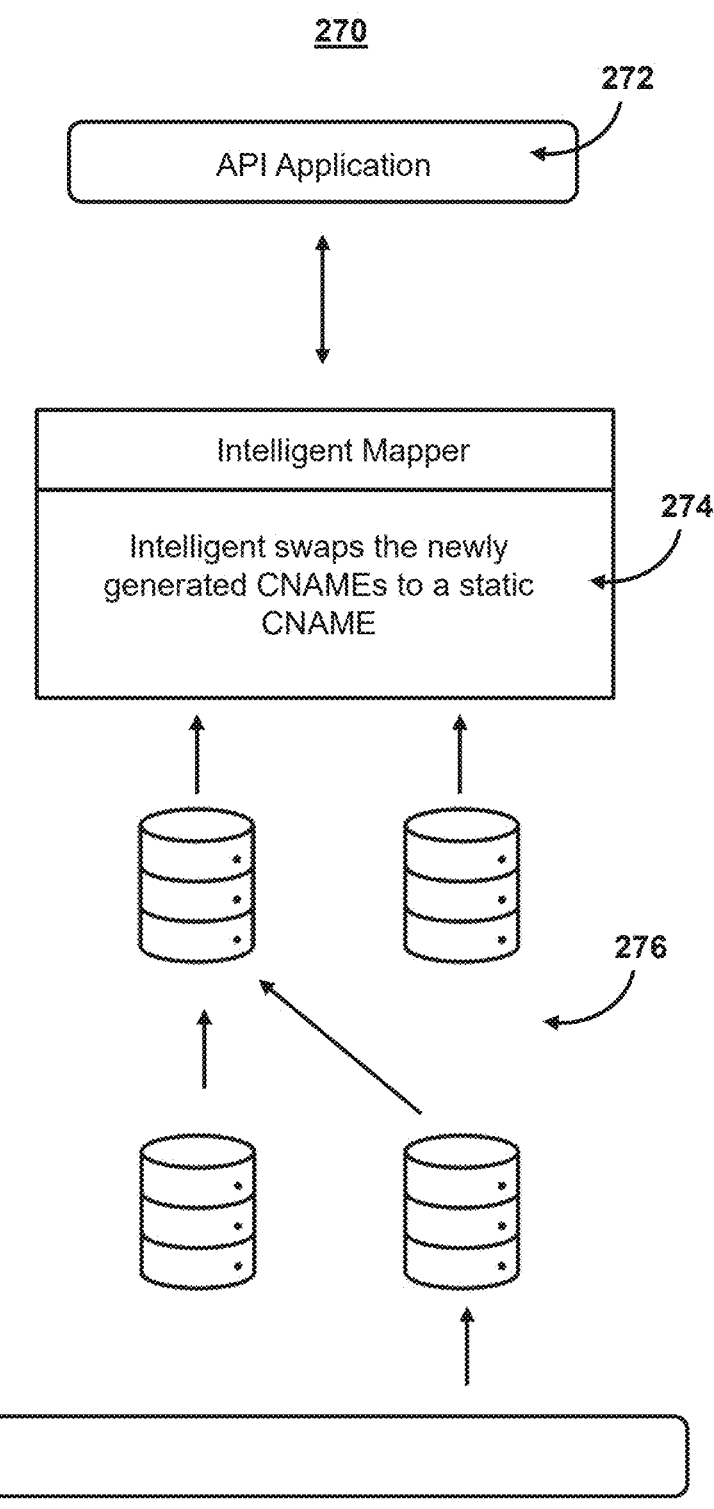

FIGS. 2A-C shows an illustrative diagram for systems employing intelligent mappers, in accordance with one or more embodiments. FIG. 2A shows an illustrative diagram for systems employing intelligent mappers to provide a multiple environment solution, in accordance with one or more embodiments. For example, different environments (e.g., environments 202) such as system environment, integration environment, performance environment, and/or production environment may each access different CNAMEs (e.g., CNAMEs 204). For example, mapper 206 may have one static URL for each of the environments. After every deployment, mapper 206 may track the new CNAME/IP address of the environment, and then intelligently map it to the static URL of the respective environment and thereby eliminate manual intervention and scale the system for any number of deployments on any environment on a continuous basis.

For example, mapper 206 may map the static URLs to various endpoints (e.g., endpoints 208), which may then be accessed by a codebase. For example, endpoints in a codebase act as specific access points that allow clients to interact with and utilize the functionalities provided by the codebase. These endpoints are typically defined as URLs or URIs (Uniform Resource Identifiers) within the codebase and are associated with specific functions, methods, or resources that the clients can request or manipulate. When a client makes a request to an endpoint, the server processes this request, executes the corresponding code, and returns the appropriate response, such as data, status messages, or the results of an operation. Endpoints can be designed to handle various HTTP methods like GET, POST, PUT, DELETE, etc., enabling different types of operations such as retrieving data, submitting data, updating resources, or deleting resources. Properly documented and structured endpoints provide a clear and organized interface for clients, ensuring that they can efficiently and effectively interact with the system. This interaction is facilitated by frameworks and protocols like REST (Representational State Transfer) or GraphQL, which standardize the way endpoints are defined and accessed, enhancing the interoperability and usability of the codebase for client applications.

In some embodiments, system 200 may facilitate an intelligent mapper to map static URLs to dynamic endpoints in a codebase by incorporating automated tracking and mapping mechanisms that operate seamlessly after each deployment. Initially, the system sets up static URLs for each environment, which serve as stable access points for clients. Upon each deployment, the system employs monitoring tools to detect and retrieve the new CNAMEs or IP addresses associated with the updated environment. The intelligent mapper, integrated with the system, continuously monitors these changes and dynamically updates its internal records to reflect the new addresses.

System 200 may achieve this through the use of automation scripts and configuration management tools that are triggered after deployment processes. These tools scan the environment, identify the new dynamic endpoints, and feed this information to the mapper. The mapper then intelligently associates the new CNAMEs or IP addresses with the predefined static URLs, ensuring that clients can access the services without interruption or the need for manual updates.

For example, to scan the environment and identify new dynamic endpoints, several tools and technologies are commonly used, each tailored to specific aspects of the deployment and networking processes. Configuration management tools may be employed to automate the detection and configuration of new endpoints. These tools can script the processes of scanning and updating configurations postdeployment. Additionally, orchestration platforms may offer built-in services for tracking and managing dynamic endpoints within containerized environments to map internal container addresses to external, stable URLs.

Network monitoring tools may be used to continuously monitor the network for changes in IP addresses and other endpoint details, providing real-time data that can be fed into the mapper. DNS management services may automate the process of tracking CNAME changes and updating DNS records accordingly. Furthermore, service discovery tools may be used to dynamically discover services within an environment and register their endpoints. These tools enable the mapper to stay updated with the current network topology and available endpoints. By integrating these tools into the deployment pipeline, the system can automatically detect new dynamic endpoints and update mappings without manual intervention, ensuring continuous and seamless access for clients.

By leveraging automation, the system ensures that these mappings are updated in real-time, thus eliminating the need for manual intervention. This capability allows the system to scale efficiently, handling any number of deployments across various environments continuously. The result is a robust and resilient infrastructure that maintains consistent client access and service availability despite the frequent changes inherent in modern continuous deployment practices.

FIG. 2B shows an illustrative diagram for systems employing intelligent mappers to provide an ephemeral servers solution, in accordance with one or more embodiments. For example, in some instances computer networks may use batch jobs. Batch jobs may be volatile and dynamic. As such, new servers may pop up, run the batch jobs in the pipeline, and then die down after the batch job. New servers may pop up every day to generate new IP addresses and in turn generate new URLs/TrueNames/CNAMEs. Application 252 may integrate with these jobs/pipelines and may not keep track of the new IP addresses and the URLs that generate every day.

Mapper 254 may receive a static URL that is mapped and every CNAME/Server that gets created maps itself to the static URL. Application 252 that relies on the batch jobs for data point themselves to the Static URL and mapper 254 takes the responsibility of mapping new CNAMEs/Servers dynamically on the fly and serve the traffic in a round robin fashion for the end users. By doing so, system 250 can scale to thousands of servers with multiple batch jobs being run in parallel and the mapper can take care of all the newly popped URLs and provide seamless application integration.

For example, system 250 may facilitate an intelligent mapper to map static URLs to dynamic endpoints in a codebase by integrating real-time tracking and automation tools that respond to the activation of ephemeral servers, such as those initiated by batch job requests. When batch jobs are triggered, system 250 spins up ephemeral servers to handle the increased workload. These servers are assigned new CNAMEs or IP addresses upon activation. To ensure continuous and seamless access, the system uses a combination of monitoring, configuration management, and dynamic DNS updating tools.

System 250 may employ configuration management tools to automate the deployment and configuration processes, ensuring that new servers are set up with the necessary network configurations. Concurrently, network monitoring tools continuously observe the network for any changes, including the addition of new servers and their associated addresses. Service discovery tools may dynamically identify and register the new ephemeral servers and their endpoints. These tools keep an updated registry of available services and their addresses, which the intelligent mapper can query in real-time. Mapper 254, equipped with automation scripts and APIs from these tools, tracks the new CNAMEs or IP addresses as they are assigned. It then dynamically updates its internal mapping database, associating the newly identified endpoints with the predefined static URLs for the respective environment. This process is seamless and automatic, eliminating the need for manual intervention. DNS management services are used to update DNS records in real-time, ensuring that the static URLs always point to the correct dynamic endpoints. This integration allows clients to access the services through the static URLs without being affected by the underlying changes in the server infrastructure. By leveraging these tools and processes, the system ensures that even when ephemeral servers are activated in response to batch job requests, the new endpoints are tracked and mapped intelligently and instantly to the static URLs, maintaining continuous and reliable access for clients.

FIG. 2C shows an illustrative diagram for systems employing intelligent mappers to provide an active/inactive stack solution, in accordance with one or more embodiments. For example, with multiple deployments happening every day in similar and different regions, every deployment can have Active/Inactive stacks. System 270 may allow for traffic to be switched with thresholds after a successful deployment.

With each deployment, new clusters and containers are created which are mapped to the Mapper and the static URL keeps track of these new CNAMEs which are created for each deployment and tracks them dynamically. End Consumers will only be pointing to the Static URL which under the hood maps these CNAMEs interchangeably and thereby reducing manual intervention.

For example, system 270 facilitates an intelligent mapper (mapper 274) to map static URLs (as used by API application 272) to dynamic endpoints (e.g., corresponding to one or more of servers 276, enabling seamless traffic switching between active and inactive stacks, by employing automated tracking and dynamic mapping mechanisms. With each deployment, new clusters and containers are instantiated, each assigned unique CNAMEs or IP addresses. For example, mapper 274 may be designed to monitor these changes in real-time, ensuring that the static URLs, which clients use to access services, are always correctly mapped to the current active endpoints.

The process begins with the deployment of new clusters and containers, during which configuration management tools are used to set up and configure the network settings, including the assignment of new CNAMEs. Concurrently, network monitoring tools may continuously track the network environment, detecting new and existing endpoints.

Service discovery tools may automatically register these new endpoints, maintaining an up-to-date registry of available services and their addresses. Mapper 274 may integrate with these service discovery tools, constantly querying them for the latest endpoint information. Upon detecting new endpoints, mapper 274 dynamically updates its internal mapping database to associate the new CNAMEs with the static URLs. DNS management services may then be used to update the DNS records in real-time, ensuring that the static URLs always resolve to the correct, currently active endpoints. System 270 may allow for traffic to be switched between active and inactive stacks effortlessly. When a new deployment occurs and new clusters become active, mapper 274 updates the mappings so that the static URLs point to the new CNAMEs. Conversely, when old clusters are decommissioned or become inactive, their mappings are removed or redirected to avoid service disruption.

End consumers continue to use the static URLs without any awareness of the underlying changes, ensuring a seamless user experience. This dynamic and automated mapping approach eliminates the need for manual intervention, providing robust support for continuous deployment and scaling while maintaining consistent and reliable access to services.

Figure 3:
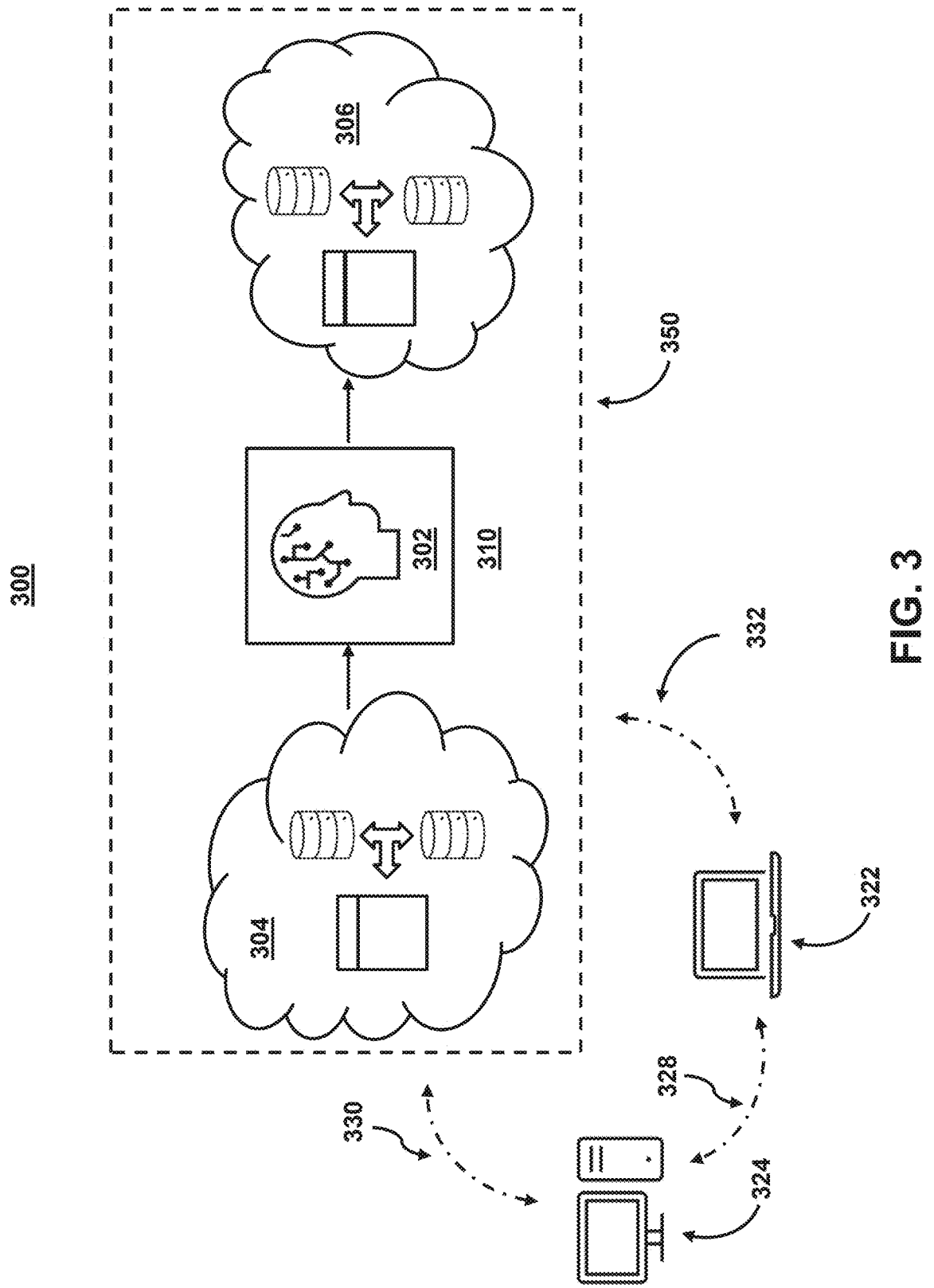
FIG. 3 shows illustrative components for a system used to facilitate an intelligent mapper, in accordance with one or more embodiments.

FIG. 3 shows illustrative components for a system used to facilitate an intelligent mapper, in accordance with one or more embodiments. For example, FIG. 3 may show illustrative components for implementing a disaster recovery solution. For example, an API call request may traverse multiple interconnected systems and have dependency on various downstream systems. During a System Disaster such as an API going down or database failing with read/write I/O connections or during an occurrence of a regional disaster, the downstream systems are bound to react with a recovery mechanism. The mapper may keep track of the new failover systems which were generated due to a disaster and map them back to the original static URL and continuously perform the evaluation. This mapping during system disaster reduces customer impact and does not require a change to their systems.

Additionally, or alternatively, FIG. 3 may show an embodiment featuring predictive swapping. For example, system 300 may facilitate a predictive swapping mechanism based on the history and traffic volume. For example, if one zone expects more traffic during a certain period (e.g., Thanksgiving, Christmas, Diwali), the mapper may apply the swapping mechanism and identify other low latency endpoints and then evenly distribute the traffic.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.), or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a new endpoint, a new mapping, a new cluster, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a new endpoint, a new mapping, a new cluster, etc.).

In some embodiments, the model (e.g., model 302) may automatically perform actions based on outputs 306. In some embodiments, the model (e.g., model 302) may not perform any actions. The output of the model (e.g., model 302) may be used to update a mapping.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

FIG. 4 shows a flowchart of the steps involved in improving data stream continuity with an endpoint mapper, in accordance with one or more embodiments. For example, the system may use process 400 (e.g., as implemented on one or more system components described above) in order to improve data stream continuity with an endpoint mapper by updating the endpoint mapper with predicted addresses of a later-provisioned data-streaming cluster. In some embodiments, process 400 may be used in updating mappings in systems based on multiple environments, ephemeral servers, and/or active/inactive stacks.

At step 402, process 400 (e.g., using one or more components described above) obtains a first data stream generated by a first set of endpoints from a first set of addresses for the first set of endpoints. For example, the system may obtain, at a mapper, a first data stream generated by a first set of endpoints from a first set of addresses for the first set of endpoints, wherein the mapper maps the first set of addresses to a set of stable addresses.

For example, the system may obtain, at a mapper, a first data stream generated by a first set of endpoints from a first set of addresses by employing a series of automated processes that ensure accurate mapping and efficient data routing. The system identifies and assigns a first set of addresses to the endpoints within the environment where the data stream is generated. These addresses can be dynamic and subject to change based on the network configuration and deployment activities.

The mapper, integrated within the system, continuously monitors these endpoints and their associated addresses. The mapper utilizes network monitoring tools and service discovery mechanisms such as Prometheus, Consul, or Eureka to track the real-time status and address assignments of the endpoints. Once the mapper captures the current addresses of the first set of endpoints, it proceeds to map these addresses to a corresponding set of stable addresses.

These stable addresses are predefined and serve as fixed points of access for external clients and other system components, ensuring a consistent and reliable interface regardless of underlying changes. The mapper dynamically updates its internal records to maintain an accurate association between the dynamic endpoint addresses and the stable addresses. This is facilitated by configuration management tools and automation scripts that handle the mapping process in real-time, ensuring that any changes in the endpoint addresses are promptly reflected in the mapper's database.

In some embodiments, the first set of endpoints may be within a first computing environment isolated from a second computing environment, and the second set of endpoints are within the second computing environment. A first set of endpoints within a first computing environment is isolated from a second set of endpoints within a second computing environment through a combination of network segmentation, access control mechanisms, and virtualization technologies. Network segmentation involves dividing the network into distinct segments or subnets, each dedicated to a specific set of endpoints. This is typically achieved using Virtual Local Area Networks (VLANs) or Software-Defined Networking (SDN) to create logical separations within the physical network infrastructure. By assigning the first set of endpoints to one subnet and the second set to another, direct communication between the two sets is restricted, ensuring isolation.

Access control mechanisms may further enhance this isolation. Firewalls, security groups, and network access control lists (ACLs) are configured to enforce strict rules about which endpoints can communicate with each other. For example, the firewall rules for the first computing environment can be set to only allow traffic from trusted sources within the same environment, blocking any attempts to access endpoints in the second environment. Similarly, security groups can be used to define permissions at the endpoint level, ensuring that only authorized devices and users can interact with specific resources.

Virtualization technologies also play a crucial role in maintaining isolation. Virtual machines (VMs) and containers run on hypervisors or container orchestration platforms like Kubernetes, which provide virtual network interfaces that are logically separated from each other. This ensures that the virtual networks of the first set of endpoints do not overlap or interfere with those of the second set. Network policies within these platforms can further restrict communication pathways, ensuring that each set of endpoints operates within its designated environment.

Additionally, identity and access management (IAM) systems enforce role-based access controls, ensuring that administrators and users have access only to the environments and resources they are authorized to manage. This prevents accidental or intentional cross-environment interactions.

By combining these techniques—network segmentation, access control, virtualization, and IAM—the system ensures robust isolation between the first and second sets of endpoints. This isolation is critical for maintaining security, compliance, and performance standards across different computing environments. By doing so, the system may maintain distinct environments that may move traffic, perform functions, and/or maintain their capabilities irrespective of the other environments.

At step 404, process 400 (e.g., using one or more components described above) streams the first data stream to a set of destination addresses. For example, the system may stream the first data stream from the set of stable addresses to a set of destination addresses. For example, when a client or another system component requests the first data stream, it references the stable addresses. The mapper intercepts these requests and, based on its mappings, directs the requests to the correct dynamic addresses of the endpoints generating the data stream. This ensures that the data stream flows seamlessly from the endpoints to the requester, with the mapper effectively acting as an intelligent intermediary that bridges the gap between dynamic network configurations and the need for stable, reliable access points. By automating the monitoring, mapping, and routing processes, the system ensures that data streams are efficiently obtained and delivered, maintaining service continuity and minimizing the need for manual intervention, even in complex and dynamically changing network environments.

At step 406, process 400 (e.g., using one or more components described above) updates the mapper to map the set of stable addresses to a set of anticipated addresses. For example, the system may update the mapper to map the set of stable addresses to a set of anticipated addresses by predicting the set of anticipated addresses for a second set of endpoints based on a history of endpoint addresses.

For example, the system may update a mapper to map a set of stable addresses to a set of anticipated addresses by utilizing predictive algorithms and historical data analysis. The system may collect and store historical data regarding endpoint addresses, capturing patterns and trends over time. This data includes information on previous deployments, address assignments, scaling events, and the lifecycle of various endpoints within the network. Using this historical data, the system employs predictive algorithms and machine learning techniques to forecast the likely addresses for a second set of endpoints. These algorithms analyze the past address allocation patterns, considering factors such as typical address ranges, frequency of changes, and the impact of specific events like scaling or maintenance. By identifying these trends, the system generates a set of anticipated addresses that are expected to be assigned to the new endpoints in future deployments.

The mapper, equipped with these predictive capabilities, updates its internal mapping database to associate the stable addresses with the anticipated addresses. This proactive mapping ensures that when the second set of endpoints is provisioned, the stable addresses already have pre-mapped counterparts, allowing for immediate and seamless access.

In some embodiments, updating the mapper may occur at a predetermined time and/or upon a predetermined condition. For example, the system may update the mapper at least 10 minutes before the second set of addresses are created and/or update operations for the mapper before the second set of endpoints outputs the second data stream. The system updates the mapper at a predetermined time and/or upon a predetermined condition by implementing scheduled updates and conditional triggers to ensure timely and accurate mapping of addresses. For instance, to prepare for the creation of a second set of addresses, the system might be configured to update the mapper at least 10 minutes before these addresses are expected to be generated. This proactive approach involves leveraging scheduling tools and predictive algorithms.

At a predetermined time, such as 10 minutes before the expected deployment of new endpoints, the system initiates an update process. The system may achieve this through scheduled tasks or cron jobs that trigger the mapper's update routine. The mapper accesses historical data, predictive models, and current network conditions to anticipate the new addresses. It then updates its internal mapping database, associating the stable addresses with these anticipated new addresses.

In addition to time-based updates, the system also monitors specific conditions that can trigger an update operation. For example, the system can be set to update the mapper when certain deployment scripts are executed, or when specific network events, like the start of a batch job or scaling operation, are detected. These conditions are monitored using real-time network monitoring tools and configuration management systems that keep track of the environment's state.

When a predetermined condition is met, such as the deployment of a new cluster or the initialization of new endpoints, the system triggers an immediate update of the mapper. This ensures that the mapper's records are current before the second set of endpoints begins generating the second data stream. The system can also incorporate validation checks to confirm that the mappings are accurate and that the stable addresses correctly point to the new dynamic addresses. By using both scheduled updates and condition-based triggers, the system ensures that the mapper is always prepared in advance of changes, maintaining seamless and reliable access to the data streams. This dual approach enhances the system's robustness, allowing it to adapt to dynamic network conditions while ensuring consistent service availability for clients.

In some embodiments, the system may predict the set of anticipated addresses by obtaining an indicator of an environment switch from the first computing environment to the second computing environment and predicting the set of anticipated addresses based on the indicator. A system predicts a set of anticipated addresses by obtaining an indicator of an environment switch from the first computing environment to the second computing environment and leveraging this indicator to forecast the likely addresses. The process begins with the system monitoring various triggers or indicators that signify an impending environment switch. These indicators can include deployment schedules, batch job initiation signals, scaling events, or specific commands issued by administrators.

Once the system detects an indicator of an environment switch, it activates its predictive algorithms and models that have been trained on historical data and patterns. This historical data includes previous environment switches, address allocations, and network configurations. The system analyzes this data to identify common address ranges, allocation sequences, and any recurring patterns associated with environment transitions.

Using this analysis, the system generates a set of anticipated addresses for the new endpoints that will be created in the second computing environment. The prediction considers factors such as the expected number of endpoints, the typical address ranges used in past deployments, and the specific characteristics of the new environment, such as its subnet configuration and IP allocation policies.

The system then updates its internal mapping database with these anticipated addresses, associating them with the stable client-facing URLs or addresses used by external clients and internal components. This preemptive mapping ensures that once the environment switch occurs and the new endpoints are provisioned, the system can seamlessly direct traffic to the correct addresses without any delays or disruptions. By continuously refining its predictive models based on ongoing data and feedback from actual deployments, the system enhances its accuracy over time. This proactive approach not only ensures a smooth transition between environments but also minimizes the need for manual intervention, reducing the risk of errors and improving overall operational efficiency.

For example, the system may predict a set of anticipated addresses by detecting indicators of an environment switch, analyzing historical data and patterns, and updating its mapping database in advance. This process ensures seamless and reliable access to the new endpoints as they come online in the second computing environment.

In some embodiments, updating the mapper may comprise the system generating a CNAME to map a dynamically generated address of the second set of addresses to a stable address of the set of stable addresses. For example, when new endpoints are provisioned within the second computing environment, they are assigned dynamic addresses that are often subject to change. To ensure seamless access, the system must link these dynamic addresses to stable, client-facing addresses. The process begins with the deployment of the new endpoints. As these endpoints come online and receive their dynamic addresses, the system's monitoring tools, such as Prometheus or Consul, detect and register these new addresses in real-time. The system then triggers a script or automation workflow designed to create the necessary CNAME records.

The script queries the registry of dynamic addresses and pairs each with its corresponding stable address. This pairing is based on predefined rules and mappings that determine which stable address each dynamic address should be associated with. The system then communicates with the DNS management service, such as AWS Route 53, Azure DNS, or Google Cloud DNS, to create CNAME records. These records map the dynamic addresses of the new endpoints to the stable addresses. For example, if a new endpoint in the second environment has a dynamic address like dynamic123.newcluster.example.com, the system will create a CNAME record pointing this address to a stable address such as service.example.com. This CNAME record effectively redirects any traffic intended for the stable address to the current dynamic address of the endpoint. By automating the creation of CNAME records, the system ensures that clients and other services can continue using the stable addresses without needing to be aware of the underlying changes in the endpoint addresses. This automation eliminates the need for manual intervention, reduces the potential for errors, and allows the system to scale efficiently, handling multiple deployments and dynamic address changes seamlessly.

In some embodiments, the system may determine that a temporal proximity threshold is satisfied, wherein the temporal proximity threshold indicates a duration before a time period associated with an endpoint application by predicting the set of anticipated addresses comprises predicting the set of anticipated addresses in response to determining that the temporal proximity threshold is satisfied and provisioning the second set of endpoints comprises provisioning the second set of endpoints to execute the endpoint application. For example, the system may determine that a temporal proximity threshold is satisfied by continuously monitoring the current time in relation to a predefined duration set to occur before a critical time period associated with an endpoint application. This threshold duration is established based on operational requirements to ensure sufficient time for the necessary preparations before the application's scheduled start. The system uses scheduling mechanisms or cron jobs to track this timing. As the current time approaches the predefined duration before the application's start time, the system recognizes that the temporal proximity threshold has been met. This triggers the system to initiate predictive operations. The prediction involves analyzing historical data, expected CIDR blocks, and address allocation patterns to forecast the anticipated addresses for the new set of endpoints. This forecasting ensures that the system is prepared for the dynamic address assignments that will be needed for the upcoming application period. Upon determining that the temporal proximity threshold is satisfied, the system updates the mapper with the predicted set of anticipated addresses. This involves creating mappings between these anticipated dynamic addresses and the stable, client-facing addresses that are used to maintain consistent access for users and other system components. These mappings are configured in advance to facilitate a seamless transition once the new endpoints are provisioned.

In some embodiments, the system determines that a temporal proximity threshold is satisfied by determining that the temporal proximity threshold indicates a duration before a time period associated with an endpoint application, predicting the set of anticipated addresses comprises predicting the set of anticipated addresses in response to determining that the temporal proximity threshold is satisfied, and provisioning the second set of endpoints comprises provisioning the second set of endpoints to execute the endpoint application. For example, the system may determine that a temporal proximity threshold is satisfied by first defining this threshold as a specific duration before the start of a time period associated with an endpoint application. This time period might be scheduled for a planned deployment, a batch job execution, or any critical application event that requires the provisioning of new endpoints. The system continuously monitors the current time against this defined threshold to ensure readiness for the upcoming event.

When the current time reaches the defined duration before the scheduled start of the endpoint application, the system identifies that the temporal proximity threshold is satisfied. This determination triggers the system to begin predictive operations in preparation for the forthcoming application needs. Once the temporal proximity threshold is met, the system initiates the process of predicting the set of anticipated addresses for the second set of endpoints. This prediction relies on various factors, including historical data, expected CIDR blocks, and address allocation patterns. The system anticipates the IP addresses that will be allocated to the new endpoints, ensuring that the infrastructure is prepared to handle the address assignments effectively.

After predicting the anticipated addresses, the system proceeds to update the mapper. The mapper associates the predicted dynamic addresses with stable, client-facing addresses. This preemptive mapping ensures seamless access for clients and other system components once the new endpoints are brought online. Subsequently, the system provisions the second set of endpoints to execute the endpoint application. This involves deploying the necessary computing resources, configuring network settings, and assigning the anticipated addresses to the new endpoints. Automation tools and orchestration platforms, such as Kubernetes or AWS Auto Scaling, facilitate this process, ensuring that the endpoints are correctly set up and ready to handle the application workload. By synchronizing the provisioning of endpoints with the temporal proximity threshold, the system ensures that all necessary resources are in place just in time for the application's execution. This approach minimizes downtime, optimizes resource utilization, and provides a smooth transition for the deployment of new endpoints, ultimately enhancing the overall efficiency and reliability of the system.

In some embodiments, the system predicts the set of anticipated addresses by obtaining a classless inter-domain routing block indicating an address range associated with the second set of endpoints and updating the mapper comprises mapping all addresses within the address range to the set of stable addresses. For example, the system may predict a set of anticipated addresses by obtaining a Classless Inter-Domain Routing (CIDR) block, which indicates the address range associated with the second set of endpoints. This CIDR block defines a specific range of IP addresses that are allocated for use within the second computing environment. By understanding this range, the system can accurately predict the potential addresses that will be assigned to new endpoints. Once the system receives the CIDR block, it parses the block to determine the start and end addresses within the specified range. This allows the system to identify all possible IP addresses that fall within this range. The predictive model uses this information to anticipate the addresses that will be dynamically assigned to the new endpoints during their provisioning.

The system then updates the mapper by creating mappings for each address within the CIDR block. This involves associating each possible IP address in the range with a set of stable client-facing addresses. The stable addresses provide a consistent interface for external clients, ensuring they can access services without needing to know the underlying dynamic addresses. To implement this, the system uses DNS management tools and configuration scripts. The mapper updates its internal database to reflect the new associations, mapping each IP address within the CIDR block to a corresponding stable address. This mapping process can be automated using tools like Ansible, Terraform, or custom scripts that interact with the DNS management service, such as AWS Route 53 or Azure DNS. For example, if the CIDR block is 192.168.1.0/24, the system identifies that the range includes addresses from 192.168.1.0 to 192.168.1.255. The mapper then creates mappings for each of these addresses to stable addresses like service1.example.com, service2.example.com, etc. This ensures that as new endpoints are provisioned and assigned addresses within this range, the stable addresses are already configured to route traffic appropriately.

By obtaining the CIDR block and updating the mapper to cover all addresses within the range, the system ensures that new endpoints can be immediately integrated into the network with minimal disruption. This approach provides a scalable and efficient method for managing dynamic address assignments while maintaining reliable access through stable addresses.

At step 408, process 400 (e.g., using one or more components described above) provisions the second set of endpoints. For example, the system may provision the second set of endpoints, wherein provisioning the second set of endpoints comprising generating a second set of addresses for the second set of endpoints, wherein the second set of addresses matches with the set of anticipated addresses. For example, during the actual deployment of the second set of endpoints, the system continuously monitors the real-time address assignments and compares them with the predicted addresses. If there are discrepancies, the mapper dynamically adjusts the mappings to ensure accuracy. This process is facilitated by automation tools and real-time monitoring systems that keep the mapper's database current and precise.

By leveraging historical data and predictive modeling, the system can efficiently anticipate and map new endpoint addresses, reducing latency and ensuring smooth transitions during deployments. This approach minimizes manual intervention and enhances the system's ability to scale and adapt to changing network configurations, maintaining reliable and consistent access for clients through the stable addresses.

In some embodiments, the system may provision the second set of endpoints by obtaining an endpoint count limit and limiting a count of provisioned endpoints to the endpoint count limit and predicting the set of anticipated addresses comprises predicting the set of anticipated addresses based on the endpoint count limit. For example, the system may provision the second set of endpoints by first obtaining an endpoint count limit, which specifies the maximum number of endpoints that can be provisioned within the second computing environment. This limit is typically defined based on resource availability, performance considerations, and operational requirements. Once the endpoint count limit is determined, the system initiates the provisioning process, ensuring that the number of new endpoints does not exceed this predefined limit. The system uses automated orchestration tools, such as Kubernetes or AWS Auto Scaling, to manage the deployment of the endpoints. These tools are configured to respect the endpoint count limit, dynamically adjusting the number of endpoints to match the specified maximum. Simultaneously, the system employs predictive algorithms to forecast the set of anticipated addresses for the new endpoints. This prediction takes into account the endpoint count limit, historical data, and address allocation patterns. By analyzing past deployments and address usage trends, the system generates a list of potential addresses that are likely to be assigned to the new endpoints. The predictive model may consider factors such as subnet configurations, typical address ranges, and the sequence of address allocation. For instance, if previous deployments have shown that addresses within a certain range are frequently used, the system will predict similar ranges for the new endpoints, adjusted to fit within the endpoint count limit. Once the set of anticipated addresses is predicted, the system updates its internal mapping database, associating each anticipated address with a stable client-facing address. This preemptive mapping ensures that, upon provisioning, the new endpoints are immediately accessible through their corresponding stable addresses, maintaining a seamless client experience. During the actual provisioning, the system continuously monitors the process to ensure compliance with the endpoint count limit. If the number of endpoints approaches the limit, the system can throttle additional provisioning requests or queue them for future deployment when resources become available. By combining endpoint count limits with predictive address modeling, the system ensures efficient resource utilization and maintains operational stability. This approach allows for accurate anticipation of network configurations, seamless endpoint provisioning, and consistent service availability, even as new endpoints are dynamically added to the environment.

At step 410, process 400 (e.g., using one or more components described above) obtains a second data stream generated by the second set of endpoints. For example, the system may obtain a second data stream generated by the second set of endpoints. Once the second set of endpoints is provisioned, each endpoint is assigned a unique address within the network. These addresses are either anticipated based on historical data or newly assigned by the system's network management tools. The mapper, already updated with the predicted or real-time addresses of the second set of endpoints, may continuously monitor the network to identify the exact addresses of the newly activated endpoints. As the second set of endpoints begins generating the data stream, the mapper dynamically maps their addresses to a corresponding set of stable addresses, which are used by clients or other system components to access the data. The system ensures that these stable addresses remain consistent, providing a reliable interface for data consumption.

At step 412, process 400 (e.g., using one or more components described above) streams the second data stream to the set of destination addresses. For example, the system may stream the second data stream from the set of stable addresses to the set of destination addresses. For example, the data stream generated by the second set of endpoints is then routed through the network to the mapper. The mapper, leveraging its updated mappings, directs the data to the appropriate stable addresses. This involves translating requests from clients, who reference the stable addresses, to the current dynamic addresses of the endpoints generating the data.

To facilitate seamless data flow, the system employs network protocols and data routing technologies that ensure low latency and high efficiency. These may include load balancers, reverse proxies, and data caching mechanisms that optimize the data stream's delivery from the endpoints to the consumers. By continuously updating the mapper with real-time address information and efficiently routing the data streams, the system ensures that the second data stream is reliably obtained and made available to clients through the stable addresses. This approach guarantees consistent access to data, regardless of the underlying dynamic nature of the endpoint addresses.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for improving data stream continuity with an endpoint mapper by updating the endpoint mapper with predicted addresses of a later-provisioned data-streaming cluster.

2. The method of the preceding embodiment, further comprising: obtaining, at a mapper, a first data stream generated by a first set of endpoints from a first set of addresses for the first set of endpoints, wherein the mapper maps the first set of addresses to a set of stable addresses; streaming the first data stream from the set of stable addresses to a set of destination addresses; updating the mapper to map the set of stable addresses to a set of anticipated addresses by predicting the set of anticipated addresses for a second set of endpoints based on a history of endpoint addresses; provisioning the second set of endpoints, wherein provisioning the second set of endpoints comprising generating a second set of addresses for the second set of endpoints, wherein the second set of addresses matches with the set of anticipated addresses; obtaining a second data stream generated by the second set of endpoints;

and streaming the second data stream from the set of stable addresses to the set of destination addresses.

3. The method of any one of the preceding embodiments, wherein updating the mapper comprises updating the mapper at least 10 minutes before the second set of addresses are created.

4. The method of any one of the preceding embodiments, wherein updating the mapper comprises completing update operations for the mapper before the second set of endpoints outputs the second data stream.

5. The method of any one of the preceding embodiments, wherein the first set of endpoints are within a first computing environment isolated from a second computing environment, and wherein the second set of endpoints are within the second computing environment.

6. The method of any one of the preceding embodiments, wherein predicting the set of anticipated addresses comprises: obtaining an indicator of an environment switch from the first computing environment to the second computing environment; and predicting the set of anticipated addresses based on the indicator.

7. The method of any one of the preceding embodiments, wherein updating the mapper comprises generating a CNAME to map a dynamically generated address of the second set of addresses to a stable address of the set of stable addresses.

8. The method of any one of the preceding embodiments, further comprising determining that a temporal proximity threshold is satisfied, wherein the temporal proximity threshold indicates a duration before a time period associated with an endpoint application, wherein: predicting the set of anticipated addresses comprises predicting the set of anticipated addresses in response to determining that the temporal proximity threshold is satisfied; and provisioning the second set of endpoints comprises provisioning the second set of endpoints to execute the endpoint application.

9. The method of any one of the preceding embodiments, further comprising determining that a temporal proximity threshold is satisfied, wherein: the temporal proximity threshold indicates a duration before a time period associated with an endpoint application; predicting the set of anticipated addresses comprises predicting the set of anticipated addresses in response to determining that the temporal proximity threshold is satisfied; and provisioning the second set of endpoints comprises provisioning the second set of endpoints to execute the endpoint application.

10. The method of any one of the preceding embodiments, wherein: predicting the set of anticipated addresses comprises obtaining a classless inter-domain routing block indicating an address range associated with the second set of endpoints; and updating the mapper comprises mapping all addresses within the address range to the set of stable addresses.

11. The method of any one of the preceding embodiments, wherein: provisioning the second set of endpoints comprises obtaining an endpoint count limit and limiting a count of provisioned endpoints to the endpoint count limit; and predicting the set of anticipated addresses comprises predicting the set of anticipated addresses based on the endpoint count limit.

12. One or more non-transitory, computer-readable mediums storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for improving data stream continuity with an endpoint mapper by updating the endpoint mapper with predicted addresses of a later-provisioned data-streaming cluster, the system comprising:
  one or more processors; and
  one or more machine-readable memory storing program instructions that, when executed by the one or more processors, perform operations comprising:
    obtaining, at the endpoint mapper, a first data stream generated by first nodes of a first computing cluster from a first set of node addresses for the first nodes, wherein the endpoint mapper maps the first set of node addresses to a set of stable client-facing addresses;
    streaming the first data stream from the set of stable client-facing addresses of the endpoint mapper to a set of client addresses adapted to data format used in the first data stream and a later data stream;
    updating the endpoint mapper to map the set of stable client-facing addresses to a set of anticipated addresses by predicting the set of anticipated addresses for second nodes of a second computing cluster that is not yet provisioned based on a history of endpoint addresses;
    provisioning the second computing cluster, the provisioning causing a creation of a second set of node addresses for the second nodes, wherein the second set of node addresses matches with the set of anticipated addresses;
    obtaining, at the endpoint mapper, a second data stream generated by the second nodes of the provisioned second computing cluster; and
    streaming the second data stream from the set of stable client-facing addresses of the endpoint mapper to the set of client addresses.

2. A method comprising:
  obtaining, at a mapper, a first data stream generated by a first set of endpoints from a first set of addresses for the first set of endpoints, wherein the mapper maps the first set of addresses to a set of stable addresses;
  streaming the first data stream from the set of stable addresses to a set of destination addresses;
  updating the mapper to map the set of stable addresses to a set of anticipated addresses by predicting the set of anticipated addresses for a second set of endpoints based on a history of endpoint addresses;
  provisioning the second set of endpoints, wherein provisioning the second set of endpoints comprises generating a second set of addresses for the second set of endpoints, wherein the second set of addresses matches with the set of anticipated addresses;
  obtaining a second data stream generated by the second set of endpoints; and
  streaming the second data stream from the set of stable addresses to the set of destination addresses.

3. The method of claim 2, wherein updating the mapper comprises updating the mapper at least 10 minutes before the second set of addresses are created.

4. The method of claim 2, wherein updating the mapper comprises completing update operations for the mapper before the second set of endpoints outputs the second data stream.

5. The method of claim 2, wherein the first set of endpoints are within a first computing environment isolated from a second computing environment, and wherein the second set of endpoints are within the second computing environment.

6. The method of claim 5, wherein predicting the set of anticipated addresses comprises:

obtaining an indicator of an environment switch from the first computing environment to the second computing environment; and predicting the set of anticipated addresses based on the indicator.

7. The method of claim 2, wherein updating the mapper comprises generating a CNAME to map a dynamically generated address of the second set of addresses to a stable address of the set of stable addresses.

8. The method of claim 2, further comprising determining that a temporal proximity threshold is satisfied, wherein the temporal proximity threshold indicates a duration before a time period associated with an endpoint application, wherein:

predicting the set of anticipated addresses comprises predicting the set of anticipated addresses in response to determining that the temporal proximity threshold is satisfied; and provisioning the second set of endpoints comprises provisioning the second set of endpoints to execute the endpoint application.

9. The method of claim 2, further comprising determining that a temporal proximity threshold is satisfied, wherein:

the temporal proximity threshold indicates a duration before a time period associated with an endpoint application;

predicting the set of anticipated addresses comprises predicting the set of anticipated addresses in response to determining that the temporal proximity threshold is satisfied; and provisioning the second set of endpoints comprises provisioning the second set of endpoints to execute the endpoint application.

10. The method of claim 2, wherein:

predicting the set of anticipated addresses comprises obtaining a classless inter-domain routing block indicating an address range associated with the second set of endpoints; and updating the mapper comprises mapping all addresses within the address range to the set of stable addresses.

11. The method of claim 2, wherein:

provisioning the second set of endpoints comprises obtaining an endpoint count limit and limiting a count of provisioned endpoints to the endpoint count limit; and predicting the set of anticipated addresses comprises predicting the set of anticipated addresses based on the endpoint count limit.

12. One or more non-transitory, machine-readable media storing program instructions that, when executed by one or more processors, cause the one or more processors to perform operations comprising:

obtaining, at a mapper, a first data stream generated by a first set of endpoints from a first set of addresses for the first set of endpoints, wherein the mapper maps the first set of addresses to a set of stable addresses;

streaming the first data stream from the set of stable addresses to a set of destination addresses;

updating the mapper to map the set of stable addresses to a set of anticipated addresses by predicting the set of anticipated addresses for a second set of endpoints;

provisioning the second set of endpoints, wherein provisioning the second set of endpoints comprises generating a second set of addresses for the second set of endpoints, wherein the second set of addresses matches with the set of anticipated addresses;

obtaining a second data stream generated by the second set of endpoints; and streaming the second data stream from the set of stable addresses to the set of destination addresses.

13. The one or more non-transitory, machine-readable media of claim 12, the operations further comprising detecting an indication of a malfunction for an initial endpoint of the first set of endpoints, wherein provisioning the second set of endpoints further comprises provisioning the second set of endpoints in response to the indication of the malfunction.

14. The one or more non-transitory, machine-readable media of claim 12, the operations further comprising determining a network traffic prediction indicating an increase in network traffic flowing to an initial endpoint of the first set of endpoints, wherein provisioning the second set of endpoints further comprises provisioning the second set of endpoints based on the network traffic prediction.

15. The one or more non-transitory, machine-readable media of claim 12, wherein updating the mapper comprises updating the mapper at least 10 minutes before the second set of addresses are created.

16. The one or more non-transitory, machine-readable media of claim 12, wherein updating the mapper comprises completing update operations for the mapper before the second set of endpoints outputs the second data stream.

17. The one or more non-transitory, machine-readable media of claim 12, wherein the first set of endpoints are within a first computing environment isolated from a second computing environment, and wherein the second set of endpoints are within the second computing environment.

18. The one or more non-transitory, machine-readable media of claim 12, wherein updating the mapper comprises generating a CNAME to map a dynamically generated address of the second set of addresses to a stable address of the set of stable addresses.

19. The one or more non-transitory, machine-readable media of claim 12, the operations further comprising determining that a temporal proximity threshold is satisfied, wherein the temporal proximity threshold indicates a duration before a time period associated with an endpoint application, wherein:

predicting the set of anticipated addresses comprises predicting the set of anticipated addresses in response to determining that the temporal proximity threshold is satisfied; and provisioning the second set of endpoints comprises provisioning the second set of endpoints to execute the endpoint application.

20. The one or more non-transitory, machine-readable media of claim 12, wherein:

provisioning the second set of endpoints comprises obtaining an endpoint count limit and limiting a count of provisioned endpoints to the endpoint count limit; and predicting the set of anticipated addresses comprises predicting the set of anticipated addresses based on the endpoint count limit.

* * * * *